350-3.79 SR
OR 3,612,640
T 3050Y
X 3054W

United States Patent

[11] 3,612,640

[72] Inventor Herwig W. Kogelnik
Fair Haven, N.J.

[21] Appl. No. 860,261
[22] Filed Sept. 23, 1969
[45] Patented Oct. 12, 1971
[73] Assignee Bell Telephone Laboratories, Incorporated
Berkeley Heights, N.J.

[54] HOLOGRAPHIC TELEPHONE DIRECTORY WITH CINEMATOGRAPHIC ACCESSION OF INFORMATION
3 Claims, 4 Drawing Figs.

[52] U.S. Cl. .......... 350/3.5, 353/26
[51] Int. Cl. .......... G02b 27/00, G03b 23/12
[50] Field of Search .......... 353/25–27; 350/3.5

[56] References Cited
UNITED STATES PATENTS
1,889,575 11/1932 Sebille .......... 353/26
OTHER REFERENCES
De Bitetto, Laser Focus, Vol. 4, No. 17, Sept. 1968 pp. 36–37 (copy in 350/3.5)

*Primary Examiner*—David Schonberg
*Assistant Examiner*—Ronald J. Stern
*Attorneys*—R. J. Guenther and Arthur J. Torsiglieri

ABSTRACT: An associative memory is disclosed that relates a first item of information, such as a name, to a second item of information, such as a telephone number. First, each unit of information, which comprises two sets of symbols constituting a first item of information and its associated second item of information, is arranged in sequence according to a place, or positional, order. In such an order, all units of information that have identical symbols at a first position within each first item of information are arranged consecutively and the units within each such consecutive arrangement are similarly order by the symbols at a second position and so on. The Fourier transforms of each unit of information in the sequence are then formed individually; and a hologram of each transform is recorded in sequence on a photosensitive medium. When this information is viewed by illuminating a single hologram in the set of ordered Fourier transform holograms and moving a sequence of such holograms through the illuminating beam, only the identical symbols in the ordered items of information will be clearly seen. Thus, in the example above, if the names are stored in alphabetic order on the holograms, when the holograms are moved rapidly, only the first few letters of the recorded names will remain constant enough to be viewable; but when the holograms are moved slowly, most, or all, the letters of the names will be viewable. So by gradually slowing the speed of the holograms moving through the illuminating beam, it is possible to work through a large number of holograms to find the particular set of symbols, such as a telephone number, that is associated with a particular set of ordered symbols, such as a name.

INVENTOR
H. W. KOGELNIK
BY Francis E. Morris
ATTORNEY

HOLOGRAPHIC TELEPHONE DIRECTORY WITH CINEMATOGRAPHIC ACCESSION OF INFORMATION

BACKGROUND AND SUMMARY OF THE INVENTION

My invention relates to information storage, accessing and display and, in particular, to the storage, accessing and display of large amounts of ordered information by holographic techniques.

To store large amounts of information in a form suitable for convenient storage, accessing, and display, it is customary to record the information on microfilm. A particular part of the information stored can then be accessed simply by locating the particular frame of microfilm where the information is stored; and it can be viewed by putting the frame in a projection system and illuminating it. While such a system works fairly well for some purposes, accessing time is often rather slow because the microfilm frames are typically stored on a reel and it takes appreciable time for the mechanism that drives the reel to unwind and rewind the reel. Alternatively, accessing time can be reduced by storing the information in greatly reduced form on a microfilm card, but such a system requires complex optics to magnify the information stored on the microfilm card and an intricate mechanism to permit viewing of different items of information. Complicating the problem is the requirement that the information that is observed be stationary during viewing. Obviously, these problems of accessing and display become particularly severe where vast amounts of information are stored on the microfilm as, for example, where the information stored is the contents of a large directory, such as a telephone directory, and the user wants to locate a particular piece of information, such as a party's telephone number, in a few seconds.

Accordingly, it is an object of my invention to improve the storage, accessing and display of information and especially the storage, accessing and display of large amounts of information.

And more particularly, it is an object of my invention to improve the storage, accessing and display of information contained in associative memories, such as telephone directories, that relate one piece of information to another piece of information.

These and other objects of my invention are accomplished with holographic techniques. When an object is illuminated, it modulates the illuminating beam to form a beam of light that carries information about the object. If this information bearing beam is temporally coherent, a record, called a hologram, can be made of the phase and amplitude of the information bearing beam by interfering on a photosensitive recording medium such as a photographic plate, the wave fronts of the information beam and a phase-related reference beam. Subsequently, proper illumination of the hologram reconstructs therefrom the stored information-bearing beam and therefore an image of the stored object.

In my invention, a special type of hologram, called a Fourier transform hologram, is used. As is well known, a Fourier transform of the amplitude and phase distribution of light at a first location in a light beam is simply an amplitude and phase distribution at a different location that is a mathematical Fourier transform of the first distribution. The Fourier transform may be made optically in several ways. For example, if the information that is to be illuminated to form the information-bearing beam is situated in the front focal plane of a lens, then the Fourier transform of the information beam is formed in the rear focal plane, which may also be called the Fourier transform plane. A hologram of the transform is then made by interfering the transform with a phase-related reference beam and recording the resulting interference pattern on a suitable photosensitive recording medium. Such a hologram has the property that an image reconstructed from it in the focal plane of a lens does not change in position when the hologram is translated in the Fourier transform plane provided the orientation of the hologram is not changed by rotation.

This property is used to advantage in the associative memory of my invention. First, each unit of information that is to be recorded, which is comprised of two sets of symbols constituting a first item of information and its associated second item of information, is arranged in sequence according to a place, or positional, order. In such an order, all units of information that have identical symbols at a first position within each first item of information are arranged consecutively and the units within each such consecutive arrangement are similarly ordered by the symbols at a second position and so on. The Fourier transforms of each unit of information in the sequence are then formed individually; and a hologram of each transform is recorded in sequence on a photosensitive medium. For example, if each unit of information comprises a subscriber's name and his telephone number, then each hologram is a Fourier transform hologram of a name and a phone number; and the associative memory stored on the photosensitive medium is comprised of an array of holograms stored in sequence on a photosensitive medium in such a way that the names recorded on the holograms are in alphabetic order within the sequence. During this storage process, care is taken to make sure that the ordered information used in forming each of the holograms is all located in the same position and orientation with respect to the photosensitive recording medium.

This ordered information is then used as an index in an associative memory to locate rapidly the information stored along with an item of ordered information. A real image of the information recorded in a Fourier transform hologram is viewed by illuminating the particular hologram, taking the inverse Fourier transform of the information beam reconstructed from the hologram and directing the resultant light onto a screen located in the real image plane of the hologram. Because the hologram is a Fourier transform hologram, the image reconstructed from it will always be located in the same position even when the hologram is translated in the Fourier transform plane provided, of course, that the orientation of the hologram is not changed by rotation and at least part of the hologram remains in the path of the illuminating beam. Hence, although the brightness of the image varies with the amount of the hologram that is illuminated, a viewer observes a steady image as long as one hologram is translated slowly through the illuminating beam. Thus, for the example given above of storing holographically a sequence of names and associated phone numbers, a viewer can read a particular name and its associated phone number when the hologram record of this information is stationary in the illuminating beam or is moving very slowly through it.

However, if the sequence of holograms is moved rapidly through the illuminating beam, then the viewer sees a succession of images reconstructed from the different holograms. Projection of random images at speeds much in excess of the critical flicker (or fusion) frequency of approximately 15 per second would, of course, create a blur. But because the holograms stored in the memory of my invention are in positional order, there is little difference between the images reconstructed from the ordered information stored in most of the adjacent holograms; and because the ordered information used in forming the holograms was all located in the same position and orientation with respect to the photosensitive recording medium, each image of the ordered information reconstructed from the hologram is reconstructed on the same portion of the viewing screen. Hence, when a sequence of ordered holograms is moved through the illuminating beam, the viewer sees whatever remains the same in the reconstructed images over the time required to perceive separate images. And because the holograms are in positional order, the amount of each image that does remain the same generally increases with increasing speed of movement of the holograms through the illuminating beam. Accordingly, by varying the speed at which the holograms are moved, it is possible to work rapidly through the ordered symbols to find the set of symbols associated with a particular set of ordered symbols. For example, when the holograms are moved rapidly through the illuminating beam, only the first one or two symbols of the ordered information will remain the same over enough holograms to be readable; and so, the viewer will only be able to scan a few symbols to locate a general area for further search. Having found this general area, the viewer then decreases the speed at which the holograms are moved through the illuminating beam; and more of the symbols in the ordered information thereupon become constant long enough to be readable. So by gradually slowing the speed of the holograms moving through the illuminating beam, it is possible to work through a large number of holograms to find a particular set of symbols, such as a telephone number, that is associated with a particular set of ordered symbols, such as a name.

BRIEF DESCRIPTION OF THE DRAWING

These and other elements, features and objects of my invention will be more readily understood from the following detailed description of the invention taken in conjunction with the following drawing in which.

DETAILED DESCRIPTION

Figure 1:
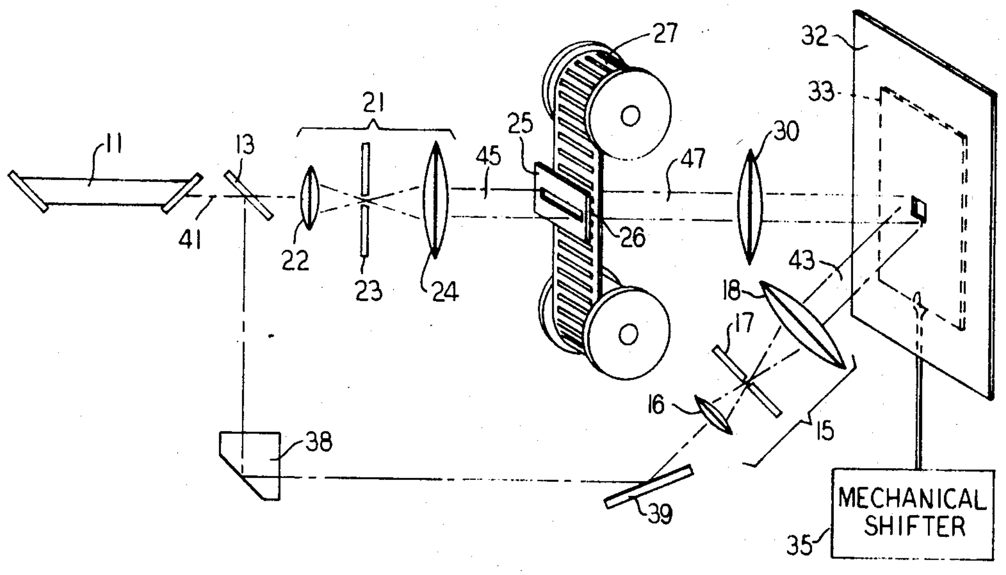
FIG. 1 is a schematic illustration of exemplary apparatus used in forming holograms in my invention.

Turning now to FIG. 1, there is shown a typical Fourier transform hologram forming system. This system is comprised of a coherent light source 11, typically a laser, a beam splitting mirror 13, a first collimating system 15, a second collimating system 21, an object 26, a Fourier transforming lens 30, a mask 32, a photosensitive recording medium 33 behind the mask, and a mechanical shifter 35 that can shift the position of the photosensitive medium. Collimating system 15 typically is comprised of an objective lens 16, a pinhole 17, and a collimating lens 18; and collimating system 21 is similarly comprised of an objective lens 22, a pinhole 23, and a collimating lens 24. In addition, a reflecting prism 38 and a mirror 39 are used to redirect light from source 11.

Object 26 is typically a transparency of two-dimensional information that is to be recorded as a hologram. For convenience the different items of information that are to be recorded as holograms are preferably recorded as separate frames on a film strip, shown in FIG. 1 as element 27; and a different frame of film strip 27 is illuminated for each hologram that is recorded. For reasons that will become more obvious below, some of the information on each frame is in order with respect to similar information on the other frames; and this ordered information has the same position and orientation within each frame. Each transparency when illuminated is located in the front focal plane of lens 30, and photosensitive medium 33 is located in the rear focal plane of lens 30. Mask 32 is typically an opaque medium having in it a small square aperture 37 that measures 1 millimeter on each edge. Mask 32 is located immediately in front of photosensitive medium 33 which can be moved by mechanical shifter 35 to position aperture 37 in front of any portion of recording medium 33.

Figure 2:
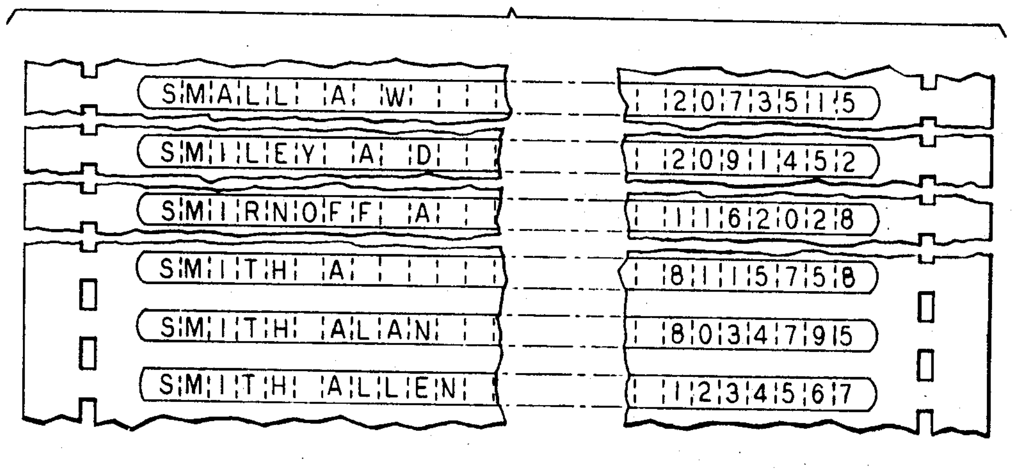
FIG. 2 is an illustration of the type of information that may be stored with my invention.

Illustratively, the information contained on each of the frames of film strip 27 is the name, address and telephone number of a different telephone subscriber. The name and phone number parts of a few such illustrative frames are shown in FIG. 2. Note that the names of the subscribers are arranged in alphabetical order. Note also that identical letters at the same place in the names of different subscribers have exactly the same orientation and exactly the same position within each frame. Consequently, because each frame is positioned for illumination at exactly the same location with respect to lens 30 and recording medium 33, the information recorded by individual holograms is the same for identical letters at the same place in different names. When stored in a series of Fourier transform holograms, this ordered information can be used as an index in an associative memory to locate rapidly the information stored along with an item of ordered information.

To record a Fourier transform hologram of the information on one of the frames of film strip 27, a beam 41 of coherent light is directed from laser 11 and split by mirror 13 into two parts. One part is reflected by prism 38 and mirror 39 to collimating system 15 where it is diverged and collimated to form a reference beam 43 that is incident on that part of photosensitive recording medium 33 that is located immediately behind aperture 37 in mask 32.

The other part of the beam split by mirror 13 enters collimating system 21 where it is diverged and collimated to form an illuminating beam 45 that is next incident on object 26, which is one frame in film strip 27. Object 26 modulates illuminating beam 45 with the information recorded on it. The resultant information bearing beam, shown as element 47 in FIG. 1, is then transformed by lens 30 to form in the plane in which recording medium 33 is located a Fourier transform of the information contained in object 26. Part of information beam 47 is incident on the part of photosensitive recording medium 33 that is located behind aperture 37. Because reference beam 43 and information beam 47 are derived from the same beam 41 of coherent light, the two beams have a constant phase relation and can interfere. The resulting interference pattern is recorded on a portion of medium 33 and this portion constitutes a hologram of the information contained in object 26.

After the first hologram is recorded, beam 41 is momentarily interrupted while film strip 27 is advanced to the next frame and medium 33 is moved a distance equal to approximately twice the height of aperture 37 so as to separate that area of medium 33 on which the first hologram was recorded from the area on which the next hologram is to be recorded. A hologram of the information on the second frame of film strip 27 is now recorded following the same procedure as that detailed above; and this process is repeated as many times as space will allow to form a column of holograms on recording medium 33. Once one column is completed, medium 33 is shifted to the right or to the left a distance equal to the width of aperture 37 and another column of holograms is recorded. And this process is repeated as many times as necessary to record on medium 33 a separate Fourier transform hologram of each frame of film strip 27.

Figure 3:
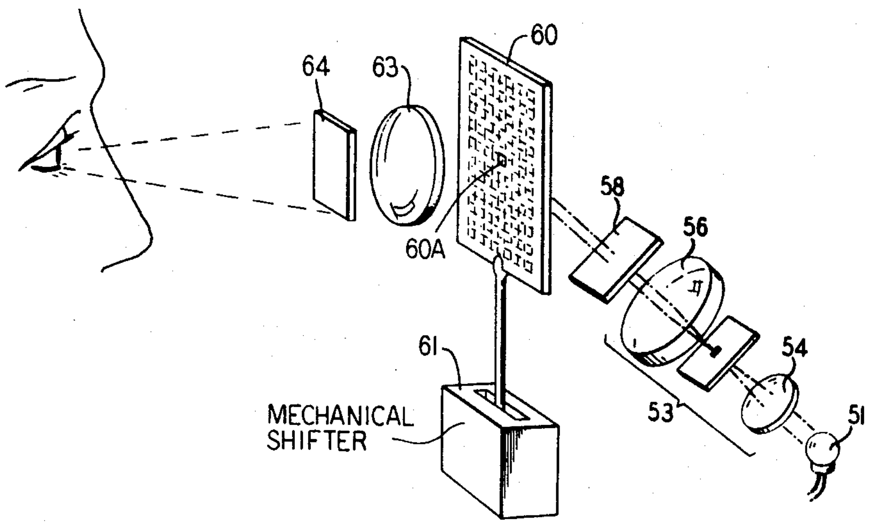
FIG. 3 is a schematic illustration of exemplary apparatus suitable for reconstructing images from the holograms formed by the apparatus of FIG. 1.

Once all the holograms have been recorded on medium 33, the medium is developed, if necessary; and the array of holograms recorded thereon is then ready to be used as an associative memory with a hologram viewing system such, for example, as that shown in FIG. 3. This system is comprised of a light source 51, which need not be monochromatic, a collimating system 53, a monochromatic filter 58, the array of holograms, shown as element 60, a mechanical shifter 61 that can shift the position of hologram array 60, a Fourier transforming lens 63, and a viewing screen 64. Collimating system 53 typically is comprised of an objective lens 54, a pinhole, and a collimating lens 56. Hologram array 60 is located in the front focal plane, or Fourier transform plane, or lens 63 and viewing screen 64 is located in the rear focal plane of lens 63.

To view all the information recorded on a hologram in array 60, an illuminating beam 52 is directed from source 51 through collimating system 53 and filter 58, which renders beam 52 monochromatic, to one of the holograms of array 60 where it is ordinarily incident at approximately the same angle reference beam 43 was incident on photosensitive medium 33 during formation of each of the holograms of the array. The hologram, which is shown in FIG. 3 as element 60A, then diffracts the illuminating beam to lens 63 which forms on screen 64 the Fourier transform of the diffracted beam. Because what is stored in each hologram of array 60 is the Fourier transform of the information on a frame of film strip 27 and because the Fourier transform of the Fourier transform of a given function is the original function, a viewer located as shown in FIG. 3 then sees on screen 64 a real image of all the information stored in illuminated hologram 60A. Thus, for the illustrative example where each hologram records a name, an address and a phone number, part of the information the viewer sees is like that illustrated in the last line of FIG. 4. Moreover, even if hologram 60A is translated slowly through the illuminating beam, the viewer still sees on screen 64 a steady, unblurred image of all the information projected from the hologram because the hologram is a Fourier transform hologram and the translation takes place in the Fourier transform plane of lens 63.

However, if hologram array 60 is moved more rapidly through the illuminating beam so that several holograms are individually illuminated in rapid succession, then the viewer sees on screen 64 a succession of real images of the information contained in the holograms. And if these images appear at a repetition rate that is faster than the critical flicker (or fusion) frequency of approximately 15 per second, which is approximately the limit of the eye's ability to perceive separate images, then the images start to run together. Projection of random images at speeds much in excess of 15 per second would, of course, create a blur. However, the holograms of array 60 are stored so that some of the information contained in each hologram is in order. For the example of names and phone numbers, they are stored so that the names are in alphabetical order. Moreover, because the ordered information recorded on each hologram had exactly the same position with respect to the hologram recording medium, the ordered information reconstructed from each hologram array 60 is observed at always the same location on screen 64. Consequently, the viewer is able to distinguish on screen 64 however much remains constant of the images that are projected onto screen 64 during any time period greater than approximately one-fifteenth of a second, which is about the length of time required to perceive separate images.

Moreover, by varying the speed at which the holograms are moved through the illuminating beam and thereby varying the rate at which different images are projected onto screen 64, it is possible to vary the amount of the projected images that remains constant during a given time period. Thus, by simply varying the projection rate, it is feasible for a viewer to scan large quantities of the index provided by the ordered information to locate a particular item of information associated with a particular item of ordered information.

Figure 4:
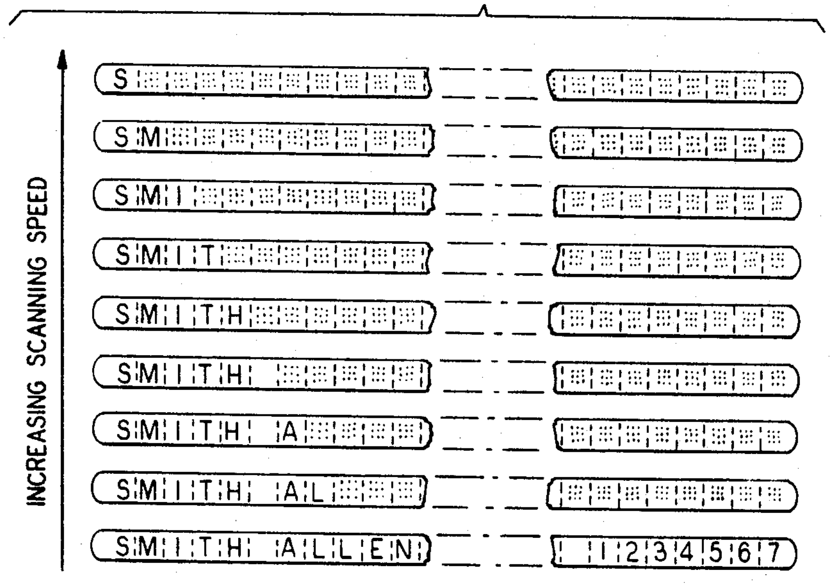
FIG. 4 is an illustration of typical images that may be reconstructed with my invention.

And in particular it is practical to scan a directory, such as a telephone directory, to find the information, such as a telephone number, associated with one of the ordered entries, such as a name, in the directory. Thus when holograms containing names and telephone numbers are moved very rapidly through the illuminating beam, only the first few letters of the alphabetized names can be discerned. For example, at the highest scanning speeds, perhaps only the first letter of the name will remain unchanged over one-fifteenth of a second and hence the viewer will be able to see only that letter followed by a blurred line as exemplified by the first line of FIG. 4. At slower speeds, however, more letters than the first will remain unchanged over the fraction of a second it takes the viewer to perceive an image; and the viewer will therefore by able to see more of each name on the holograms passing through the illuminating beam. Thus, in the example of FIG. 4, the viewer will see SM, then SMI, then SMIT, and so on as he decreases the speed at which the holograms are moved through the beam. And eventually, by slowing the speed of the holograms as the name in interest approaches, the viewer is able to work through the letters of a name to find the phone number associated with it, as illustrated in FIG. 4.

Obviously, my invention admits of many modifications in practice. The particular information used to index or order the holograms stored in the memory need not be a set of names composed of letters of the English alphabet, as used in the examples above, but can be a collection of codes derived from any set of symbols provided that the symbols within each code have place or positional value. This means, of course, that each code must be comprised of two or more symbols, or their absence, and that different weights or values must be assigned by some convention to the different positions of the symbols in the code. This assignment of value in the code used to index the holograms may be accomplished, just as it would be if words of numbers constituted the index, by ordering the holograms so that all holograms having the same symbol in the first position in their index code constitute one consecutive group and within such a group all holograms having the same symbol in the second position constitute one consecutive subgroup and so on.

The efficient use of such a positional, or syntactical, system as the index of my invention makes it possible to scan the holograms at varying speeds because the number of consecutive appearances of a particular symbol at a particular location, and therefore a viewer's ability to perceive the symbol, varies with the position of the symbol within the code. For example, if 10 symbols are available in codes having a length of three symbols to index the information in the associative memory, then one such code can be assigned to each one of a set of 1,000 items of information and the items can be ordered as follows. Ten large subsets of 100 items each are first formed by grouping together all items having the same first symbol in their assigned codes; and within each large subset, 10 small subsets are formed by grouping together all items that have the same symbol in the second position. The hologram memory is then formed and used as detailed in conjunction with FIGS. 1 through 4 above. Because the same first symbol appears at the same place on screen 64 during the illumination of 100 consecutive holograms, this symbol can be observed even if the whole 1,000 hologram memory is passed through the illuminating beam in a second or two. The second symbol, however, cannot be observed at such speeds because it appears on only 10 consecutive holograms at 10 different places in the series of holograms. At slower speeds, however, such as 100 holograms every second or two, the second symbol is also visible, but not the third symbol. And finally at speeds of 10 holograms every second or two, the third symbol as well is visible.

While, as indicated above, the holograms must be grouped together according to the symbols located at certain positions in the information recorded on the holograms, it is not necessary that the holograms be arranged within each such group according to some relation or order between the symbols at a given position. In other words, while the symbols in some systems, such as the Arabic number system, can be ordered according to both position and magnitude within each position, it is only necessary in my invention to order the holograms by the position of the symbols. However, it does seem preferable to use magnitude of symbols as well as position to order the holograms because this can help someone searching through the memory to locate a particular item of information.

The particular apparatus used in describing the invention is only illustrative of any number of arrangements that are available. There are other means for forming Fourier transform holograms, one of which is detailed in U.S. Pat. Nos. 3,533,673 and 3,533,676 issued to L. H. Lin and assigned to Bell Telephone Laboratories, Incorporated.

The particular size of the hologram that is formed, 1 millimeter square, is determined by a tradeoff between diffraction effects and maximum information storage. A hologram of this size does permit the storage of several hundred thousand items of information on a photosensitive medium of reasonable proportions. This storage can be increased even more by storing additional holograms in the same portion of the hologram recording medium. Methods for accomplishing such storage are disclosed in P. J. van Heerden's U.S. Pat. No. 3,296,594 on an Optical Associative Memory.

In describing the recording of the holograms above, I recommended that after the recording of each hologram the photosensitive medium be moved relative to the mask a distance equal to approximately twice the height of its aperture. This ensures that only one hologram at a time will be in the illuminating beam when the sequence of holograms is moved through the beam and that the reconstruction from one hologram will therefore not interfere with the reconstruction from another hologram. While such a separation between holograms seems desirable because it minimizes interference, it is wasteful of the space available on the recording medium; and to the extent that the interference can be borne, the holograms can be stored closer together simply by moving mask 32 some distance less than twice the height of its aperture.

In detailing the reconstruction of images from the hologram, I described the use of a conventional light source and a monochromatic filter for illuminating the holograms rather than the somewhat more usual use of a laser. A laser could, of course, be used, but the conventional light source is less expensive and ordinarily more rugged and durable and therefore preferable. To prevent possible distortions due to magnification of the images projected from the holograms of the memory, I also prefer the sue of a monochromatic filter that passes light having approximately the same frequency as that of the coherent light used in forming the holograms. Any number of conventional mechanisms can be used for moving the sequence of holograms through the illuminating beam. Obviously, these mechanisms should be capable of producing such movement at widely varying speeds under the control of the viewer; but such requirements are well within the art. One advantage of my invention that simplifies the mechanism required is that an image projected from a hologram remains constant even when the hologram is moving through the illuminating beam. Consequently, in contrast to the need to stop each frame of ordinary microfilm in order to read it, it is not necessary in my invention to stop the movement of the holograms through the beam in order to read them. This makes it possible to eliminate from my projector shutters and some of the more elaborate mechanisms for advancing microfilm. Another advantage of the invention is that it is not necessary to use complex optics to magnify the information stored in each 1 millimeter square hologram because the hologram itself is able to recreate an image having the same size as the original object stored in the hologram. And, if desired, even the Fourier transforming lens need not be used if other methods for making the Fourier transform, such as the one described in the Lin patent applications, are used.

Numerous other modification may also be devised by those skilled in the art that fall within the spirit and scope of my invention.

What is claimed is:

1. A telephone directory comprising:
an array of holograms;
each hologram being a record of the Fourier transform of a first item of alphanumeric information and a record of an associated second item of information;
said array of holograms being formed by:
recording each first item of information in alphabetic or numeric order on a first recording medium;
locating each ordered unit in turn with respect to a second recording medium so that identical symbols in the same position in successive first items have approximately the same location and angular orientation with respect to the second recording medium;
illuminating each ordered unit in turn with a beam of coherent light to form an information-bearing beam; and
recording in the same order on the second recording medium a record of the interference between each information-bearing beam and a reference beam having a temporally constant phase relation with it;
means for illuminating a hologram in the array with a monochromatic, incoherent visible light beam to reconstruct on a display screen a real image of the information recording thereon; and
means for moving the array of holograms through the illuminating beam to reconstruct from the moving array of holograms a sequence of images in which at least part of the image of each first item of information reconstructed from the holograms in part of the array of holograms remains the same in both content and location during the time said part of the array of holograms moves through the illuminating beam and the amount of each part that remains the same generally increases with decreasing speed of movement of the holograms through the illuminating beam.

2. The telephone directory of claim 1 wherein each first item of information is a subscriber's name and each second item of information is that subscriber's telephone number.

3. The telephone directory of claim 1 wherein each first item of information is a subscriber's address and each second item of information is that subscriber's telephone number.